United States Patent [19]

Boltinghouse et al.

[11] 3,847,026

[45] Nov. 12, 1974

[54] CROSS PRODUCT PICKOFF FOR BALL GYROS OF THE ELECTROSTATIC LEVITATION TYPE

[75] Inventors: Joseph C. Boltinghouse, Whittier; Frank M. Pelteson, Santa Ana; John C. Pinson, Anaheim, all of Calif.

[73] Assignee: Rockwell International Corporation, El Segundo, Calif.

[22] Filed: Nov. 12, 1970

[21] Appl. No.: 88,776

[52] U.S. Cl. ............................................... 74/5.6 D
[51] Int. Cl. .............................................. G06c 19/08
[58] Field of Search ............... 74/5, 5.6, 5.7; 308/10

[56] References Cited
UNITED STATES PATENTS

| | | | |
|---|---|---|---|
| 3,411,838 | 11/1968 | Atkinson | 308/10 |
| 3,482,455 | 12/1969 | Boltinghouse et al. | 74/5.6 |
| 3,495,465 | 2/1970 | Nordsieck | 74/5 |
| 3,545,287 | 12/1970 | Smith | 74/5.7 X |
| 3,566,700 | 3/1971 | Staats | 74/5 |

*Primary Examiner*—Robert F. Stahl
*Attorney, Agent, or Firm*—L. Lee Humphries; H. Fredrick Hamann; Rolf M. Pitts

[57] ABSTRACT

The invention is directed to a cross-product pickoff mechanism for an electrostatically supported ball type gyroscope, wherein the pickoff determines the attitude (i.e., angular orientation) of the ball spin axis relative to the gyroscope case for any arbitrary attitude. The gyroscope case is provided with a set of electrostatic electrodes arrayed in three-dimensional space. A levitating electric field is maintained between the ball and the electrodes. The ball is so constructed as to be unbalanced about its spin axis. Under such conditions, as the ball spins, it orbits, and its surface alternately advances towards and recedes from any given electrode at the spin frequency, producing a field modulation signal. The amplitude and phase pattern of the modulation signals at the several electrodes is a unique function of the attitude of the spin axis relative to the electrodes. Means are provided for processing the in-phase and quadrature fundamental modulation signals occuring in each of the levitation channels so as to determine the attitude of the ball.

10 Claims, 16 Drawing Figures

INVENTORS
BY JOSEPH C. BOLTINGHOUSE
FRANK M. PELTESON
JOHN C. PINSON
Edward Dugas
ATTORNEY

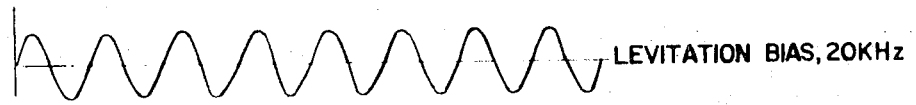
FIG. 6a — LEVITATION BIAS, 20KHz
FIG. 6b — +SAMPLE CONTROL
FIG. 6c — −SAMPLE CONTROL
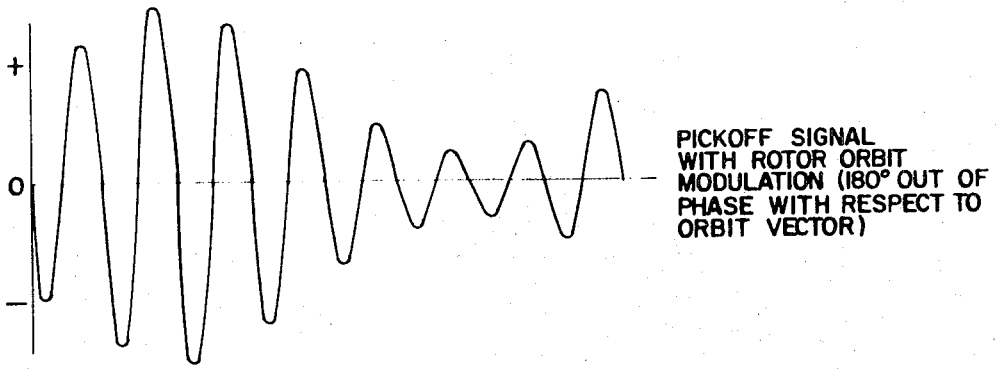
FIG. 6d — PICKOFF SIGNAL WITH ROTOR ORBIT MODULATION (180° OUT OF PHASE WITH RESPECT TO ORBIT VECTOR)
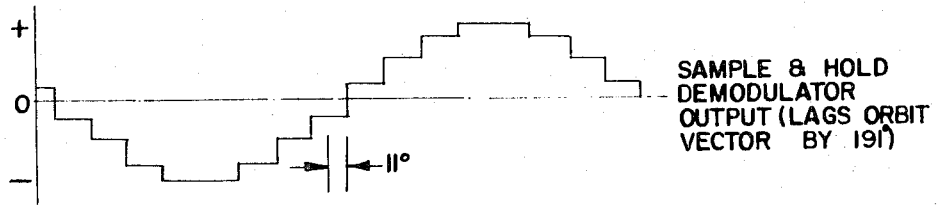
FIG. 6e — SAMPLE & HOLD DEMODULATOR OUTPUT (LAGS ORBIT VECTOR BY 191°)
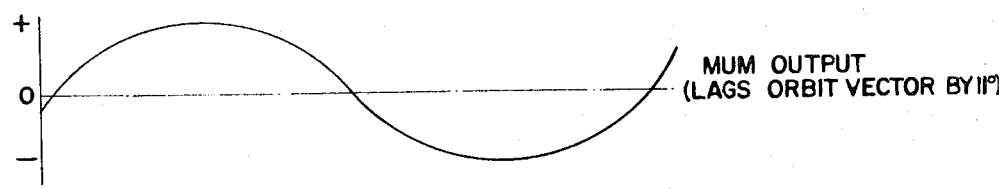
FIG. 6f — MUM OUTPUT (LAGS ORBIT VECTOR BY 11°)

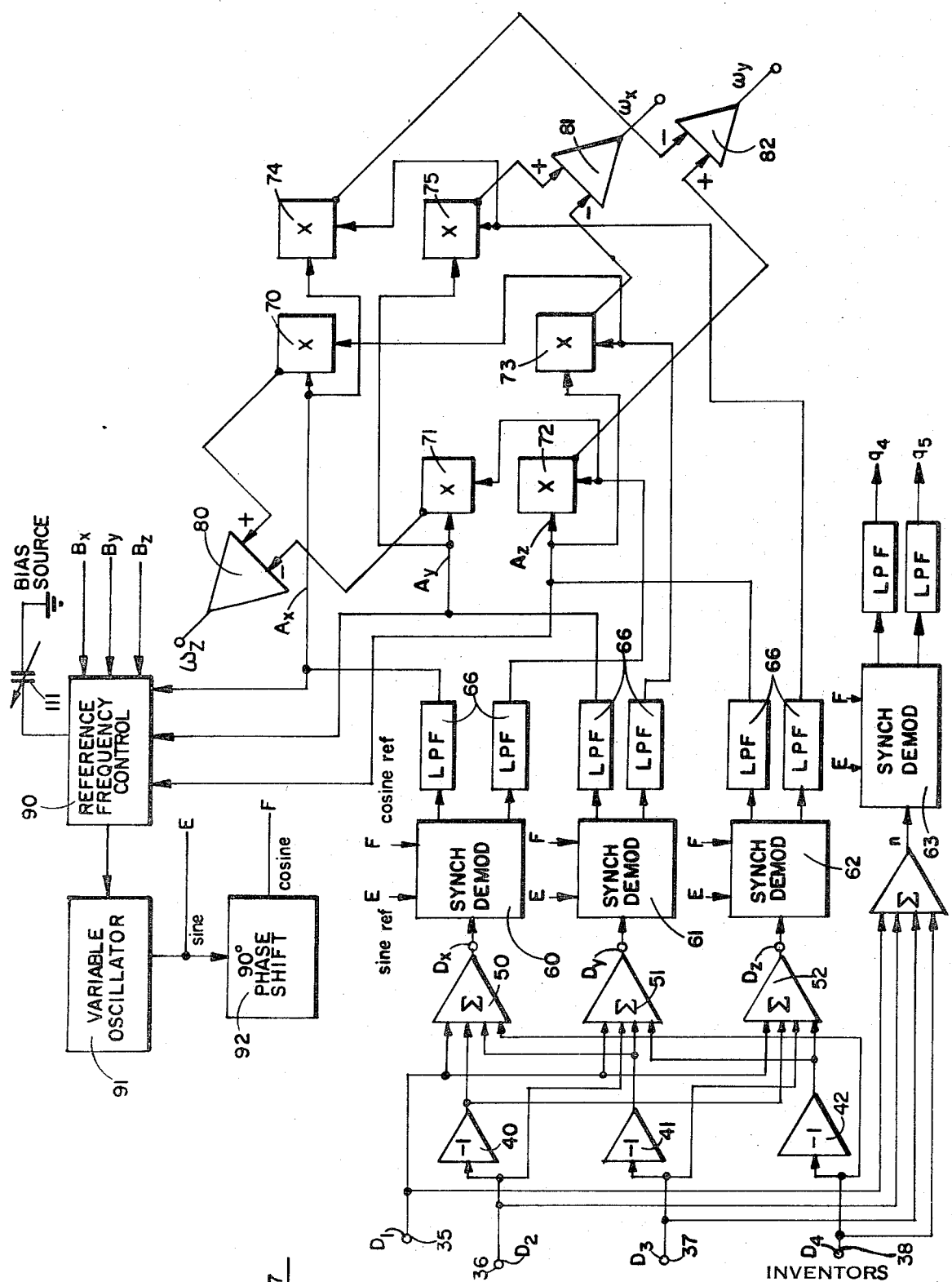

CROSS PRODUCT PICKOFF FOR BALL GYROS OF THE ELECTROSTATIC LEVITATION TYPE

BACKGROUND OF THE INVENTION

1. Field of the Invention

The field of the invention is related to gyroscopes of the electrostatic pickoff type and, more particularly, in the provision of a cross-product type pickoff for determining the attitude of the ball spin axis relative to the gyroscope case.

2. Description of the Prior Art

Gyroscopes exist in the prior art in which a spinning ball is supported or levitated in a high vacuum by electrostatic forces. For this purpose, typically three or more opposed pairs of spherical-surfaced electrodes are provided in a closely fitted cavity and circuit means are provided such that, if the ball becomes uncentered, i.e., recedes from one electrode of a pair and advances towards the other, the electrostatic force is increased and decreased, respectively, at the two electrodes, urging the ball towards center. For an exmaple, see U.S. Pat. No. 3,334,949, entitled "Electrostatic Bearing" By James L. Atkinson.

In some cases, the same electrodes perform sensing and forcing functions; in others, for example U.S. Pat. No. 3,482,455 entitled "Electrostatic Levitation Control System," by J. C. Boltinghouse et al., assigned to North American Rockwell Corporation, the assignee of the present invention, different electrodes are used for sensing and forcing.

In using an electrostatic ball gyroscope for many purposes in flight control and in inertial navigation, it is desirable that the case be fixed to the frame of the carrying craft (ship, aircraft, missile, etc.) as distinguished from being mounted on a three-axis stabilized platform. Such manner of use does away with the complex mechanical elements and gimbal servo systems of a stabilized platform. In frame-fixed, so-called "strapdown" systems, the ball spin axis remains angularly fixed in inertial space while the craft may assume any arbitrary attitude (angular orientation).

In such strapdown systems, the problem is presented of accurately measuring the attitude of the gyro case, which is fixed to the craft frame relative to the ball spin axis. For practical purposes, the accuracy of sensing of the spin axis must be of the order of one milliradian (3.4 minutes of arc) or better. One class of methods and apparatus which has been proposed for spin axis sensing is the otpical class. Some sort of optical pattern is put on the ball and a plurality of optical pickoffs are provided, sensing the changing orientation of the pattern. A typical system of this sort is U.S. Pat. No. 3,154,453, entitled "Gyroscopic Control Apparatus," by R. D. Ormsby. Such systems suffer certain disadvantages. First, the optical system is cumbersome and bulky. Second, it is exceedingly difficult to provide a pattern on a sphere, which may be only a centimeter or so in diameter, which yields sufficient angular resolution. Third, even given a fine enough pattern, it is almost impossible to locate it accurately enough relative to the actual spin axis of the ball. A co-pending application of interest is U.S. Pat. application No. 47,506, entitled "Electrostatic Pickoff System for Ball Gyros of the Electrostatic Levitation Type," by J. C. Boltinghouse, et al., one of the co-inventors of the present application. In the referenced application, the ball is made unbalanced in a plane normal to the axis of major moment of inertia so that when it spins, it orbits. The effect of the ball unbalance is to modulate, at the spin frequency, the electrical field between the ball and each electrode. For every attitude of the spinning ball relative to the electrodes, there will be a unique modulation pattern. One problem associated with this particular type of pickoff is that it possesses singularities which can only be circumvented by complicated switching logic and channel recombination.

SUMMARY OF THE INVENTION

According to one aspect of the invention, there is provided an electrostatically supported ball gyro with an all-attitude pickoff which does away with any need for markings or patterns of any sort on the ball. Instead, the arrangement is comprised as follows:

The ball is made unbalanced in a plane normal to the axis of major moment of inertia so that when the ball spins, it orbits. That is, as viewed from any fixed point in the plane normal to the spin axis, the surface of the ball advances and recedes at the spin frequency.

The ball is disposed within a spherical cavity defined (typically) by four pairs of diametrically opposed octantal electrodes. The means described herein limits itself to an octantal electrode configuration, to teach the process. The state of the art in electrostatically supported ball gyros is such that the process described is applicable to six-electrode, 12-electrode, or any other electrode configuration deemed practical to the levitation of the ball. A levitating servo circuit means is provided for each pair such that upon departure of the ball from a centered condition (thereby increasing the average gap distance from one electrode of a pair and decreasing the gap distance from the other) the voltages across the gaps are respectively increased and decreased, to urge the ball toward center, i.e., to levitate the ball. (The levitation action just described takes place whether a balanced or unbalanced ball is used.)

The effect of the ball unbalance is to modulate, at the spin frequency, the electrical field between the ball and each electrode. The orbital motion described is most pronounced when the spin frequency is made to be well above the levitation-servo bandpass frequency. The amplitude and phase of the modulations at the several electrodes depends on the orientation of the ball spin axis relative to the electrodes. For every attitude of the spinning ball relative to the electrodes, there will be a unique modulation pattern. The modulation pattern for each channel is demodulated against a sine reference signal and a cosine reference signal to produce two signals, one representing that component of the pickoff signal which is in the phase with the reference signal and that component of the pickoff signal which is in exactly 90° phase with the reference signal. Means are provided for determining from these demodulated signals signals which define the orbital plane of the ball with respect to the case which plane, in turn, uniquely refers the spin axis of the ball with respect to the levitating electrodes (the case).

It is important to note that provision of a pickoff system in accordance with the present invention requires nothing in the way of added mechanical or electro-optical elements. The structure of the gyroscope itself contains nothing in addition to what is needed for levitation alone; a great advantage as regards producibility and cost. All that the invention requires is additional circuits to process the signals from the existing electrodes.

It is therefore an object of the present invention to provide an electrostatically supported gyroscope with an attitude pickoff system which requires no added mechanical or optical elements, but instead requires only the electrodes provided for levitation.

It is another object of the present invention to provide an electrostatically supported ball gyro with an attitude pickoff based on kinematical rather than optical principles, and making use of the modulation of the electrical field in the levitation channels by an unbalanced ball, viz. one in which the center of mass is displaced laterally from the ball geometrical center.

It is an additional object of the present invention to provide a pickoff system for an electrostatically supported ball gyro which gyro uses sets of levitation electrodes positioned symmetrically about a mass unbalanced ball.

It is another object of the present invention to provide a pickoff system for an electrostatically supported ball gyro in which the ball is constructed as to have its center of mass displaced from its geometrical center along a minor axis of the moment of inertia, so that the ball orbits when spinning, the amount of such displacement being such as to produce substantial modulation of the electrical field between the levitation electrodes and the ball.

The foregoing objects of the present invention will become more apparent and better understood when taken in conjunction with the following description and accompanying drawings, throughout which like characters indicate like parts and which drawings form a part of this application.

BRIEF DESCRIPTION OF THE DRAWINGS

An embodiment of the invention and diagrams illustrative of its manner of functioning appear in the accompanying drawings, in which:

FIGS. 6a to 6f are diagrams showing the character of the signals at various points in the circuits of FIG. 5.

FIG. 7 illustrates in circuit block diagram form means for achieving cross-product pickoff signal processing.

DESCRIPTION OF THE PREFERRED EMBODIMENTS

Figure 1:
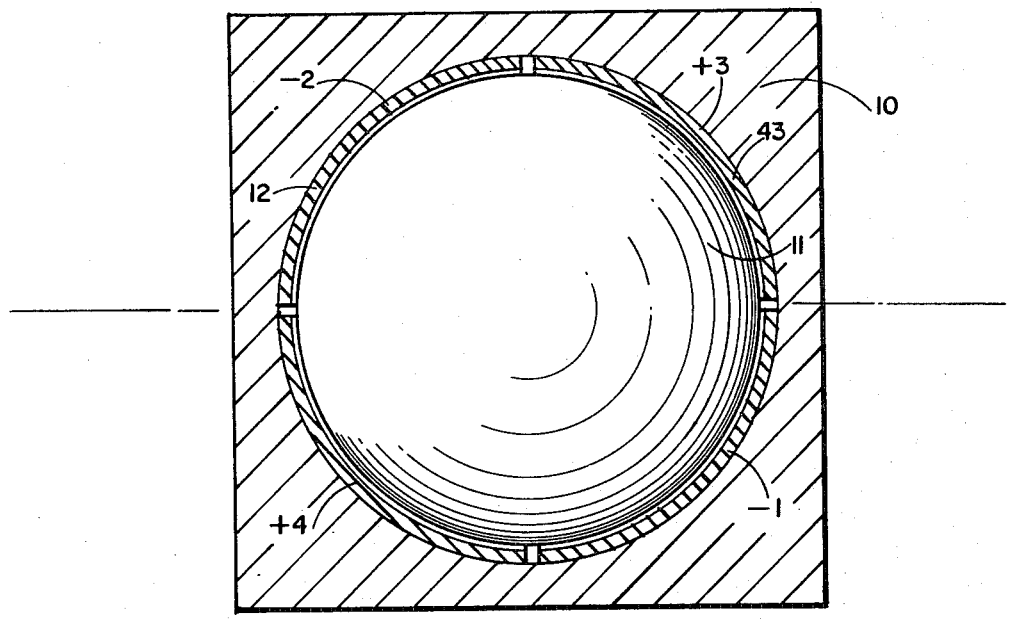
FIG. 1 is a center section view of an electrostatic gyroscope to which the invention is applicable.
Figure 2:
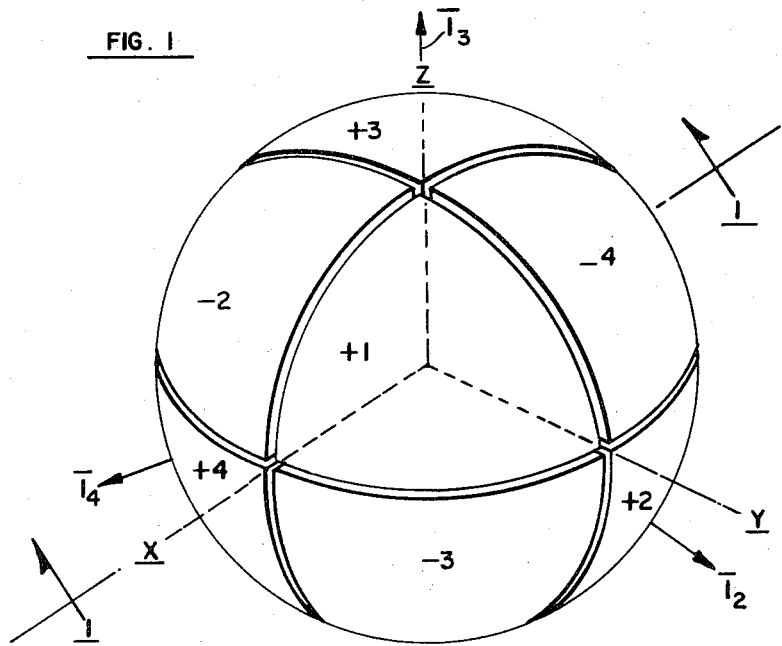
FIG. 2 is an isometric view of the electrode assembly of the gyroscope of FIG. 1.

FIGS. 1 and 2 show schematically a gyroscope comprising a non-conducting ceramic case 10 with a spherical internal contour and a conductive-surfaced spinning ball 11. Within the case is a spherical cavity 12 lined with eight octantal electrodes, shown, as seen from the outside, in FIG. 2, which are denoted, for convenience in analysis, as $+1, -1, +2, -2, +3, -3,$ and $+4, -4$. Each pair, e.g., $+1$ and $-1$, are diametrically opposed. The electrode surfaces may be thought of as the projection, upon a sphere, of the eight faces of a regular octahedron. The axes of the electrode set are taken as $x, y, z$ in FIG. 2. The $x$ and $z$ axes define the plane along which a section is taken for FIG. 1. A vacuum exists within the spherical cavity 12.

Each pair of electrodes, e.g., $+1$ and $-1$, are connected into a levitating servo system, to be described, such that departure of the ball 11 from the center of the spherical cavity 12 which, for example, decreases the gap at $+1$ and increases it at $-1$, results in voltage decrease and increase respectively to center the ball. It will be noted that four non-orthogonal levitation channels are provided, the angle between any pair of channels being approximately 110°.

Figure 3:
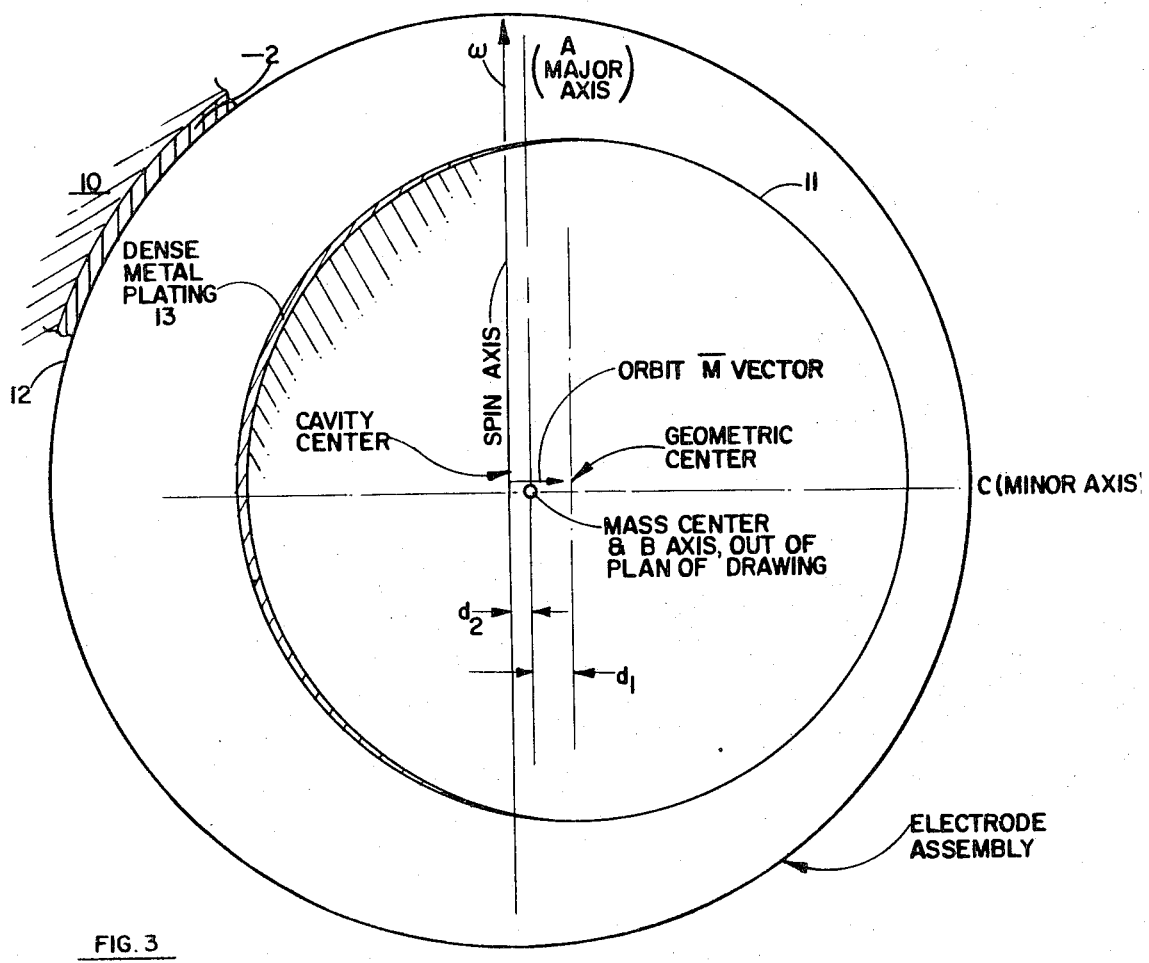
FIG. 3 is a schematic view of the gyroscope rotor ball constructed in accordance with the invention.

FIG. 3 is a schematic central cross-section of the ball 11, which is typically a solid mass of beryllium or other low-density material, of the order of 0.4 inch in diameter. Its surface is ideally a true sphere. One side is provided with a very thin (typically 4 micro-inch) layer of a dense metal such as tantalum, as indicated at 13, which displaces the center of mass a distance $d_1$ of the order of 16 micro-inches away from the geometrical center, or about 5 percent of the typical 300 micro-inch gap, and the mass center a distance $d_2$ approximately 0.34 micro-inches from the cavity center. The dense metal layer establishes the C axis or the AB plane. In other words, it establishes an axis of major moment of inertia A, and two minor axes, B.C. The mass unbalance is almost entirely radial. In other words, the mass unbalance is almost entirely along the C-axis. This is important because mass unbalance along the spin axis is a source of error torque under the acceleration of gravity and inertial accelerations. Radial mass unbalance is not a source of error torque.

The ball typically spins at about 2,550 rps. A motor, not shown, is provided for initially bringing the ball up to speed. The spin frequency is far above the servo natural frequency (typically about 800 Hz); therefore, the ball spins very nearly on the center of mass, the discrepancy, D, being of the order of 0.34 micro-inches. The geometrical center of the ball orbits in a circle typically of 16 to 20 micro-inches radius. (It will be appreciated that if the servo were infinitely stiff, the ball would spin about its geometrical center and the present pickoff system would not be operable).

The invention is not dependent on use of any particular levitation circuit. A specific electrostatic levitation circuit will be described to complete the teaching of a preferred embodiment. The levitation circuit's function is to servo-control the voltages at the eight electrodes so as to keep the ball centered.

Primarily, it is pointed out that the force F exerted by an electrode on the ball is given by the expression:

$$F = k \text{ (voltage/gap)}^2 \qquad (1)$$

It can be shown that if (as is this case) only one frequency is involved in the levitation, the force exerted by one electrode is simply proportional to the current-squared supplied to the electrode, independent of the gap; thus:

$$F = ki^2 \quad (2)$$

Figure 4:
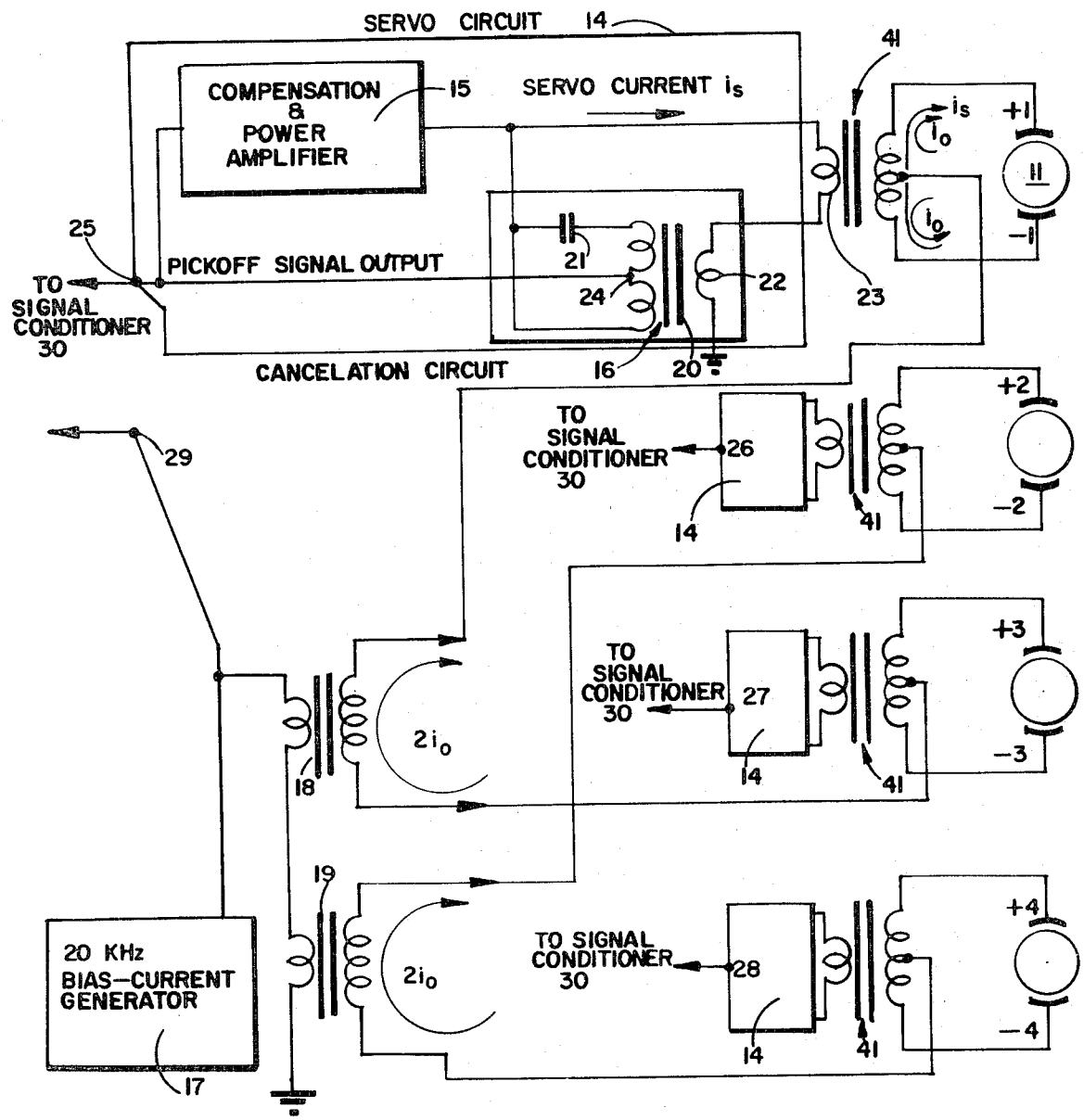
FIG. 4 is a diagram of the rotor levitation circuits.

Reference is made to FIG. 4, which shows a complete levitation circuit for one channel (electrodes +1 and −1), the circuits for the other three channels being identical. A center-tapped transformer 41 couples the electrodes, +1 and −1, to a servo circuit 14, including a compensation and power amplifier 15 and a cancellation circuit 16 (to be described). A bias current generator 17 supplies, via transformers 18 and 19, a bias voltage at the center tap of transformers 41.

The current supplied to the electrodes consists of two parts: a constant current bias $2i_o$ and a servo current $i_s$. From FIG. 4 it can be seen that the bias currents going in and out of the transformer 41 center taps are euqal regardless of ball position. While it is not immediately obvious, it can be shown that each of these bias currents is divided into two equal parts $i_o$ by the high inductance of the gyroscope transformers and, again, this effect is independent of ball position. It follows that the net force exerted on the ball for one axis is given by:

$$F = k\,[(i_o + i_s)^2 - (i_o - i_s)^2] = 4ki_oi_s \quad (3)$$

The force along a levitation axis is then linearly proportional to the servo current, and can be made proportional to the pickoff signal. In typical cases the compliance of the servo levitation is of the order of a few micro-inches per g.

The levitation system derives its pickoff signal from the transformer winding 23. If the ball 11 is uncentered, the bias currents $i_o$ will produce a voltage across the transformer winding 23. This voltage is called the pickoff signal and will be proportional to the ball displacement from center. However, added to the pickoff signal will be another voltage due to the servo current $i_s$ coming from the power amplifier 15. The cancellation circuit 16 is required to eliminate servo contamination of the pickoff signal. The cancellation transformer 20 is wound on the same kind of core as transformer 41, and the windings 22, 23 and 24 all have the same number of turns. By properly adjusting the capacitance of capacitor 21, the servo current $i_s$ will encounter exactly the same impedance in flowing through winding 22 as it does through winding 23, and the voltages produced by the current across windings 22, 23, and 24 will all be identical. Winding 24 subtracts from the pickoff signal output 25 any voltage due to the servo current. The levitation signal output appears at terminals 25, 26, 27, and 28 (FIG. 4) and the bias current generator furnishes an output at terminal 29.

Figure 5:
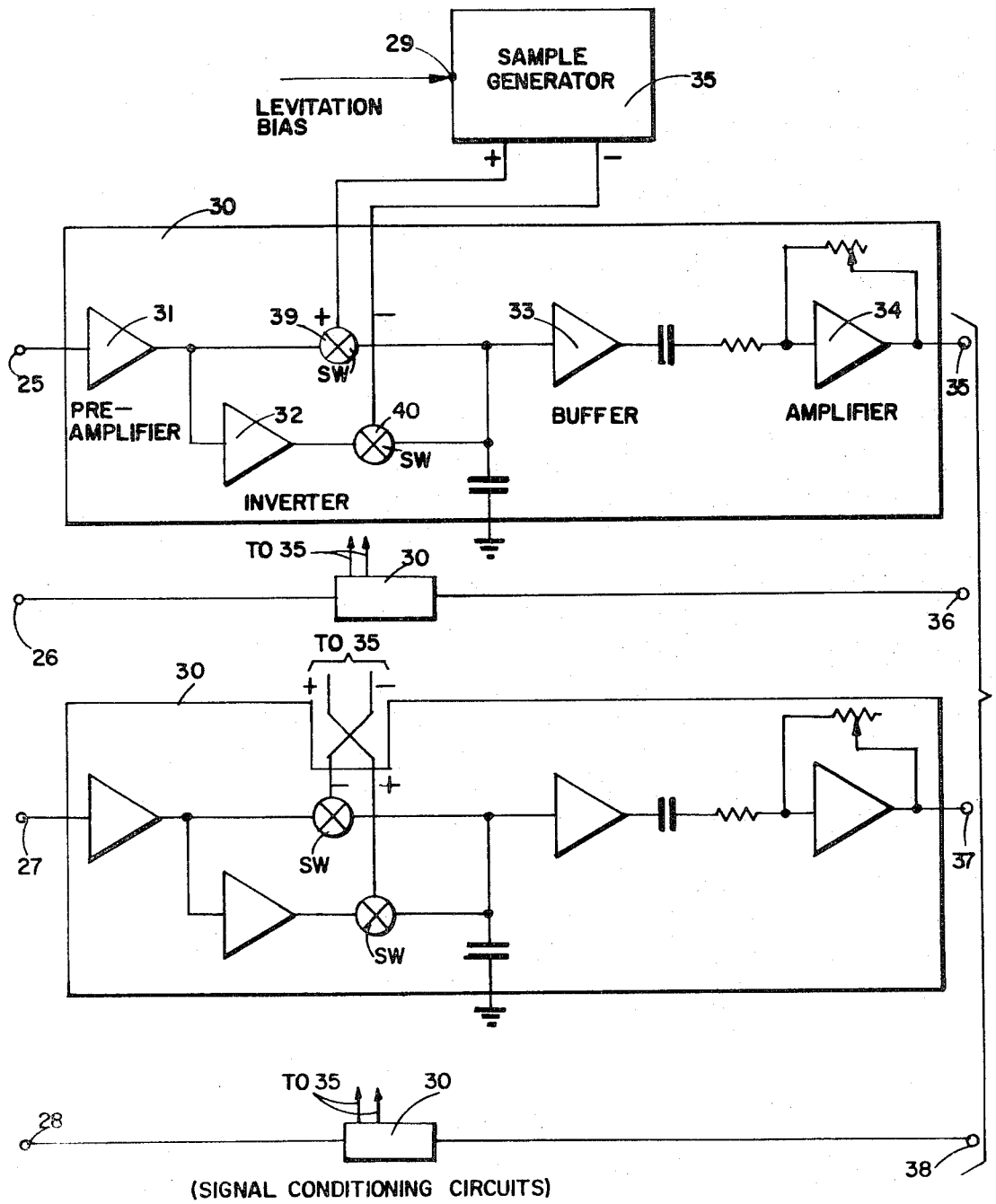
FIG. 5 is a diagram of signal conditioning circuits.

The four pickoff signals are demodulated in what is termed a signal conditioner, which is shown in FIG. 5. It is comprised of four identical circuits 30 each having a preamplifier 31, an inverter 32, a buffer 33 and an adjustable gain amplifier 34. A sample generator 42 supplies pulse signals to the circuits via switches 39 and 40. The outputs of circuits 30 are called mass-unbalance modulation or MUM signals and appear at terminals 35, 36, 37 and 38. These signals are simply the modulation envelopes of the four pickoff signals.

Referring to FIG. 6 which is a diagram showing the nature of the signals at the several parts of the circuit of FIG. 5, the pickoff signal (at input terminal 25) is shown as a modulated sine wave in FIG. 6d. FIG. 6a shows the levitation bias signal (20 KHz), and directly below, in FIGS. 6b and 6c, the corresponding output pulses from the sample generator.

The sample-and-hold demodulated output (FIG. 6e) appears at the output of buffer 33, and is amplified and inverted at the amplifier 34 to produce the MUM signal (FIG. 6f) which, as stated, is simply the modulation envelope of the input signal. It is to be noted that the MUM signals typically lag the orbit vectors (of FIG. 3) by 11°. This is explained by the fact that the sample-and-hold technique produces a stair-step output. With 40,000 samples per second, the 2,550 Hz output lags one-half a step:

$$\text{Lag} = \tfrac{1}{2} \cdot 2{,}550/40{,}000 \cdot 360° = 11° \quad (4)$$

The spin axis attitude information is contained in the relative phase and amplitude relationships of the four MUM signals appearing at terinals 35, 36, 37, and 38 in FIG. 5.

There are various ways in which such information can be processed to yield the desired information; namely the attitude of the spin axis of the ball relative to the case.

With the eight plate configuration shown in FIG. 2 there are four opposite pairs of plates numbered +1 and −1, +2 and −2, +3 and −3, and +4 and −4. We define unit vectors $\overline{1}_1, \overline{1}_2, \overline{1}_3$ and $\overline{1}_4$ as perpendicular to the centers of the respective plus numbered plates, The $x$, $y$, $z$ axes are an orthogonal set defined outward at the corners of the +1 plate. With this in mind we can write:

$$\begin{bmatrix} \overline{1}_1 \\ \overline{1}_2 \\ \overline{1}_3 \\ \overline{1}_4 \end{bmatrix} = \frac{1}{\sqrt{3}} \begin{bmatrix} 1 & 1 & 1 \\ -1 & 1 & -1 \\ -1 & -1 & 1 \\ 1 & -1 & -1 \end{bmatrix} \begin{bmatrix} \overline{1}_x \\ \overline{1}_y \\ \overline{1}_z \end{bmatrix} = [W] \begin{bmatrix} \overline{1}_x \\ \overline{1}_y \\ \overline{1}_z \end{bmatrix}$$

Eq. (5)

where $$[W] = \frac{1}{\sqrt{3}} \begin{bmatrix} 1 & 1 & 1 \\ -1 & 1 & -1 \\ -1 & -1 & 1 \\ 1 & -1 & -1 \end{bmatrix}$$

Eq. (6)

Referring to FIG. 7, the pickoff signal associated with each plate pair measures almost exactly the component of displacement that lies along that plate axis. Thus for a displacement, $\overline{D}$, of the ball geometrical center from the cavity center, the numbers 1, 2, 3 and 4 plate pairs measure $$D_1 = \overline{1}_1 \cdot \overline{D}$$
$$D_2 = \overline{1}_2 \cdot \overline{D}$$
$$D_3 = \overline{1}_3 \cdot \overline{D}$$
$$D_4 = \overline{1}_4 \cdot \overline{D}$$

(7)

The measured values of $D_1$, $D_2$, $D_3$ and $D_4$ are used to find components on the $x$, $y$, $z$ axes $$D_x = \bar{1}_x \cdot \bar{D}$$
$$D_y = \bar{1}_y \cdot \bar{D}$$
$$D_z = \bar{1}_z \cdot \bar{D}$$

(8)

where $D_x$, $D_y$ and $D_z$ are the components of the ball geometrical center displacement from the cavity center. Taking the dot product of D with the vectors of Equation 7, we obtain the relationship $$\begin{bmatrix} D_1 \\ D_2 \\ D_3 \\ D_4 \end{bmatrix} = [W] \begin{bmatrix} D_x \\ D_y \\ D_z \end{bmatrix}$$

Eq. (9)

From Equation 9, it is clear that $D_x$, $D_y$ and $D_z$ can be found from $D_1$, $D_2$, $D_3$ and $D_4$. In fact, $D_x$, $D_y$ and $D_z$ are overdetermined in Equation 9. Allowing for errors in $D_1$, $D_2$, $D_3$ and $D_4$, the least squares solution is $$\begin{bmatrix} D_x \\ D_y \\ D_z \end{bmatrix} = [W^T W]^{-1} W^T \begin{bmatrix} D_1 \\ D_2 \\ D_3 \\ D_4 \end{bmatrix}$$

$$= \frac{\sqrt{3}}{4} \begin{bmatrix} 1 & -1 & -1 & 1 \\ 1 & 1 & -1 & -1 \\ 1 & -1 & 1 & -1 \end{bmatrix} \begin{bmatrix} D_1 \\ D_2 \\ D_3 \\ D_4 \end{bmatrix} = \frac{3}{4} W^T \begin{bmatrix} D_1 \\ D_2 \\ D_3 \\ D_4 \end{bmatrix}$$

Eq. (10)

Notice that each column of W (Equation 5) sums to zero. From Equation 9 we see that this means that $D_1 + D_2 + d_3 + D_4$ is zero regardless of the spin axis position. The MUM pickoff signals appearing at points 35, 36, 37 and 38 are transformed into the X, Y, Z coordinate signals $D_x$, $D_y$ and $D_z$ with summing means 50, 51 and 52. Looking toward generating additional measurements for use in self-calibration, let us define $$\eta = D_1 + D_2 + D_3 + D_4$$

(11)

For a gyro free of errors, $\eta = 0$. We can augment matrix Equation 10 to include $\eta$.

$$\begin{bmatrix} D_x \\ D_y \\ D_z \\ \eta \end{bmatrix} = \frac{\sqrt{3}}{4} \begin{bmatrix} 1 & -1 & -1 & 1 \\ 1 & 1 & -1 & -1 \\ 1 & -1 & 1 & -1 \\ 1 & 1 & 1 & 1 \end{bmatrix} \begin{bmatrix} D_1 \\ D_2 \\ D_3 \\ D_4 \end{bmatrix} = U \begin{bmatrix} D_1 \\ D_2 \\ D_3 \\ D_4 \end{bmatrix}$$

Eq. (12)

where $$U = \frac{\sqrt{3}}{4} \begin{bmatrix} 1 & -1 & -1 & 1 \\ 1 & 1 & -1 & -1 \\ 1 & -1 & 1 & -1 \\ 1 & 1 & 1 & 1 \end{bmatrix}$$

Eq. (13)

The $\eta$ equation is implemented by summing the quantities $D_1$, $D_2$, $D_3$ and $D_4$ in summing amplifier 53.

The displacement components $D_x$, $D_y$ and $D_z$ can be expressed as follows:

$$D_x = G_x + M_x$$
$$D_y = G_y + M_y$$
$$D_z = G_z + M_z$$

(14)

where $G_x$, $G_y$, $G_z$ are displacements of the center of mass from the cavity center and $M_x$, $M_y$, $M_z$ are displacements of the geometrical center from the center of mass. The center of mass displacements $G_x$, $G_y$, $G_z$ can arise in many ways, and are not important in determining the spin axis orientation. The displacements $M_x$, $M_y$, $M_z$ are the components on the x, y and z axes of the MUM vector, $\bar{M}$, shown in FIG. 3. With the case fixed in inertial space, these components vary sinusoidally in time at the ball spin frequency. Thus, they can be expressed as $$M_x = A_x' \cos \omega_s t + B_x' \sin \omega_s t$$
$$M_y = A_y' \cos \omega_s t + B_y' \sin \omega_s t$$
$$M_z = A_z' \cos \omega_s t + B_z' \sin \omega_s t$$

(15)

where $\omega_s$ is the ball angular spin rate. If $\bar{1}_x$, $\bar{1}_y$, and $\bar{1}_z$ are unit vectors along the x, y, and z axes, then the MUM vector, $\bar{M}$, can be written as $$\bar{M} = \bar{1}_x M_x + \bar{1}_y M_y + \bar{1}_z M_z$$
$$= \bar{1}_x (A_x' \cos \omega_s t + B_x' \sin \omega_s t) + \bar{1}_y (A_y' \cos \omega_s t + B_y' \sin \omega_s t)$$
$$+ \bar{1}_z (A_z' \cos \omega_s t + B_z' \sin \omega_s t)$$
$$= \bar{A}' \cos \omega_s t + \bar{B}' \sin \omega_s t$$

(16)

where $$\bar{A}' = \bar{1}_x A_x' + \bar{1}_y A_y' + \bar{1}_z A_z'$$
$$\bar{B}' = \bar{1}_x B_x' + \bar{1}_y B_y' + \bar{1}_z B_z'$$

(17)

Figure 8:
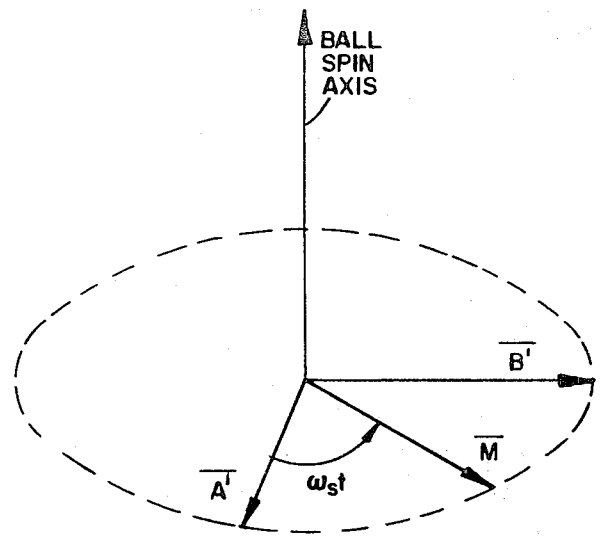
FIG. 8 illustrates the positioning of the orbit vector components.

Equation 16 leads to the interpretation illustrated in FIG. 8. $\bar{A}'$ and $\bar{B}'$, vectors fixed in inertial space, are orthogonal to the ball spin axis and to each other. That is, the $\bar{B}'$ vector is rotated 90° with respect to the $\bar{A}'$ vector. $\bar{A}'$ and $\bar{B}'$ are the same length as the MUM vector $\bar{M}$. $\bar{A}' = \bar{M}$ at $t = 0$, and $\bar{B}' = \bar{M}$ at $t = \frac{1}{4}(2\pi/\omega_s)$. From this it is clear that the spin axis lies in the direction of the vector $\bar{A}' \times \bar{B}'$.

We have yet to show how $\bar{A}'$ and $\bar{B}'$, or equivalents, can be generated. They can be generated as follows: The pickoff signals are synchronously demodulated using a reference whose frequency, $\omega_s + \delta\omega$, is very near the spin frequency, $\omega_s$. This process consists of two parallel operations: (1) demodulating each pickoff signal by a reference cosine wave and low-pass filtering the result and (2) demodulating each pickoff signal by a reference sine wave and low-pass filtering the result. The operations performed on $D_x$, $D_y$ and $D_z$ are shown schematically in FIG. 7. The signal $D_x$ is fed to a synchronous demodulator 60 which receives the reference sine and cosine signals, E and F, respectively, and provides two output signals; one a function of the cosine reference and the other a function of the sine reference. Both signals are fed to independent but identical low-pass filters 66. The $D_y$ and $D_z$ channels are identical to the $D_x$ channel. For the $D_x$ signal the output of the demodulator using the cosine reference is $$(G_x + A_x' \cos \omega_s t + B_x' \sin \omega_s t)(2 \cos (\omega_s + \delta\omega)t)$$
$$= 2G_x \cos (\omega_s + \delta\omega)t$$
$$+ (A_x' \cos \delta\omega t - B_x' \sin \delta\omega t)$$
$$+ (A_x' \cos (2\omega_s + \delta\omega)t + B_x' \sin (2\omega_s + \delta\omega)t)$$

(18)

The low pass filter 66 rejects the terms involving $2\omega_s \delta\omega$ and, assuming $G_x$ has relatively little power in the frequency region near $\omega_s$, rejects the term involving $G_x$. The output of the low pass filter, defined as $A_x$, is $$A_x = A_x' \cos \delta\omega t - B_x' \sin \delta\omega t \tag{19}$$

By similar reasoning, the output of the low pass filter following the demodulator using the sine reference as $$B_x = A_x' \sin \delta\omega t + B_x' \cos \delta\omega t \tag{20}$$

By going through a similar development it can be shown that with $D_y$ as an input the synchronous demodulator outputs are.

$$A_y = A_y' \cos \delta\omega t - B_y' \sin \delta\omega t$$
$$B_y = A_y' \sin \delta\omega t + B_y' \cos \delta\omega t \tag{21}$$

Similarly with $D_z$ as an input, the synchronous demodulator outputs are $$A_z = A_z' \cos \delta\omega t - B_z' \sin \delta\omega t$$
$$B_z = A_z' \sin \delta\omega t + B_z' \cos \delta\omega t \tag{22}$$

We have established that by using the displacement signals $D_x$, $D_y$, and $D_z$, already being generated for the levitation servo, as inputs to three synchronous demodulators driven by the same reference signals, the quantities $A_x$, $B_x$, $A_y$, $B_y$, $A_z$, $B_z$, given by Equations 19 through 22, can be generated. To see how the spin axis direction can be determined from the demodulator outputs, let us define the vectors whose components are these outputs $$\overline{A} = \overline{1}_x A_x + \overline{1}_y A_y + \overline{1}_z A_z$$
$$\overline{B} = \overline{1}_x B_x + \overline{1}_y B_y + \overline{1}_z B_z \tag{23}$$

Using Equations 19, 20, 21 and 22 in Equation 23

$$\overline{A} = (\overline{1}_x A_x' + \overline{1}_y A_y' + \overline{1}_z A_z') \cos \delta\omega$$
$$-(\overline{1}_x B_x' + \overline{1}_y B_y' + \overline{1}_z B_z') \sin \delta\omega$$
$$= \overline{A}' \cos \delta\omega - \overline{B}' \sin \delta\omega \tag{24}$$

Similarly from Equation 23

$$\overline{B} = \overline{A}' \sin \delta\omega t + \overline{B}' \cos \delta\omega t \tag{25}$$

Figure 9:
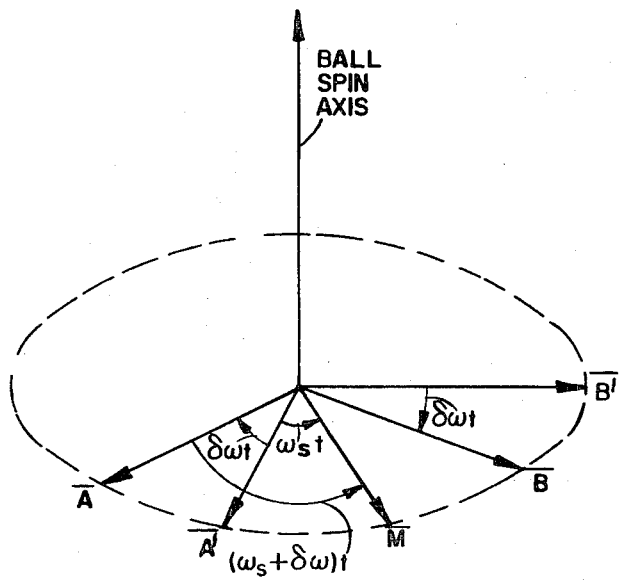
FIG. 9 illustrates the detected orbit plane of the spinning ball.

From Equation 24 we see that $\overline{A}$ is equal in length to $\overline{M}$ and is rotated from $\overline{A}'$ negatively about the ball spin axis by an angle $\delta\omega t$. See FIG. 9. From Equation 25 we see that $\overline{B}$ has the same length and is rotated in the same direction from $\overline{B}'$ by $\delta\omega t$. Then $\overline{A}$ and $\overline{B}$ are orthogonal and both lie in the plane perpendicular to the spin axis. Thus the spin axis lies in the direction of $\overline{A} \times \overline{B}$. In fact, assuming that each $\overline{A}$ and $\overline{B}$ component ($A_x$, $A_y$, $A_z$, $B_x$, $B_y$, $B_z$) has scaled by the constant $|\overline{M}|^{-1}$ somewhere along the line so that $|\overline{A}| = |\overline{B}| = 1$, then the components of $\overline{A} \times \overline{B}$ are the spin axis direction cosines. If $\omega_x$, $\omega_y$, and $\omega_z$ are the direction cosines between the spin axis, $\overline{1}_s$, and the $x$, $y$, and $z$ axes, then $$\omega_x = A_y B_z - A_z B_y$$
$$\omega_y = A_z B_x - A_x B_z$$
$$\omega_z = A_x B_y - A_y B_x \tag{26}$$

Equations 24, 25 and 26 show how the demodulated displacement pickoff signals can be used to compute the spin axis direction.

The $\overline{A} \times \overline{B}$ operation is performed by a combining means comprised of multipliers 71, 72, 73, 74 and 75 in conjunction with differential amplifiers 80, 81, and 82. The signal $A_x$ is fed to multipliers 70 and 74 which multipliers also receive the signals $B_y$ and $B_z$, respectively, to form the outputs $A_x B_y$, and $A_x B_z$. The signal $A_y$ is fed to multipliers 71 and 75, which multipliers also receive the signals $B_x$ and $B_z$, respectively, to form the outputs $A_y B_x$ and $A_y B_z$. The signal $A_z$ is fed to multipliers 72 and 73 which multipliers also receive the signals $B_x$ and $B_y$, respectively, to form the product outputs $A_z B_x$ and $A_z B_y$. The signal $A_z B_y$ is subtracted from the signal $A_y B_z$ by means of differential amplifier 81 to form the output signal $\omega_x$, which signal represents the spin of the axis along the X-axis. The signal $A_x B_z$ is subtracted from the signal $A_z B_x$ by means of differential amplifier 82 to form the output signal $\omega_z$, which signal represents the direction cosine of the spin axis along the Y-axis. In a like manner, the signal $A_y B_x$ is subtracted from the signal $A_x B_y$ by means of differential amplifier 80 to form the output signal $\omega_z$, which signal represents the direction cosine of the spin axis along the Z-axis.

Other useful information can be derived from $\overline{A}$ and $\overline{B}$. We have already established that the $\overline{A}, \overline{B}$ set of vectors rotates at a rate $-\overline{1}_s \delta\omega$ relative to the $\overline{A}'$, $\overline{B}'$ set, thus with respect to inertial space. If sample values of $\overline{A}$ and $\overline{B}$ are taken separated by a time $\Delta t$, with $\delta\omega \Delta t \ll 1$ $$\overline{A}_n - \overline{A}_{n-1} = -\delta\omega \Delta t \, \overline{B}_n$$

or $$\delta\omega = -1/\Delta t \, (\overline{A}_n - \overline{A}_{n-1}) \cdot \overline{B}_n$$
$$= -1/\Delta t \, [(A_{x,n} - A_{x(n-1)}) B_x + (A_{y,n} - A_{y(n-1)}) B_y + (A_{z,n} - A_{z(n-1)}) B_z]$$

Figure 10:
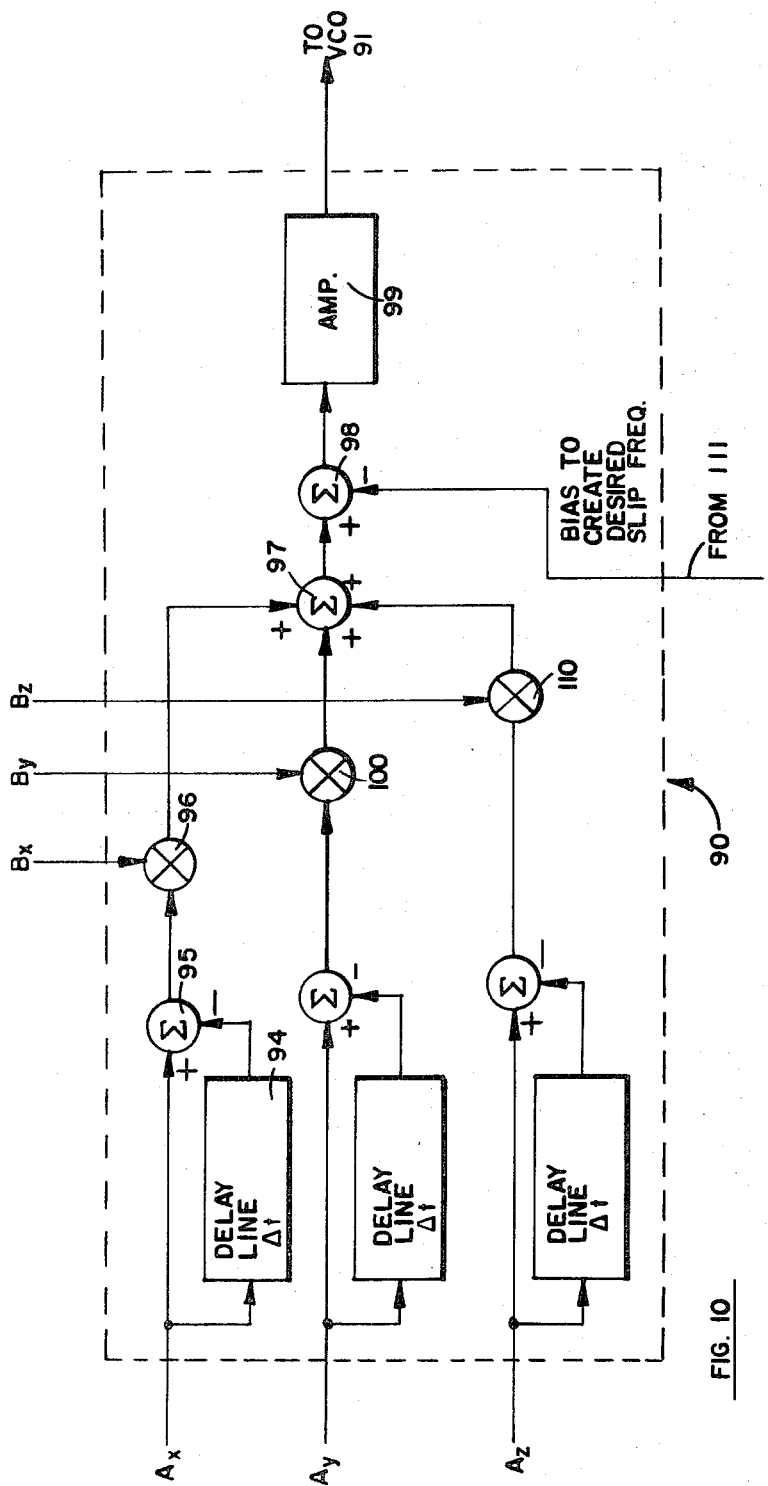
FIG. 10 illustrates in circuit block diagram form a demodulator reference frequency control which may be used in the circuit of FIG. 7.

Equation (27) provides a method of computing $\delta\omega$. The result of this computation can be used to control the frequency of the variable oscillator 91 so that $\delta\omega$ is zero or any other desired value. Equation 27 is implemented in the reference frequency control circuit 90 illustrated in FIG. 10. The $A_x$, $A_y$ and $A_z$ signals are fed to identical independent delay lines 94 and to identical, independent, summing (difference) means 95. The delay lines 94 delay the signals at their inputs by an amount $\Delta t$. The delayed signal is then subtracted from the received signal in summing means 95 to provide a difference signal. The respective difference signals are then multiplied independently in multipliers 96, 100 and 110 by the signals $B_x$, $B_y$ and $B_z$, respectively, The output products from the multipliers are then summed together in summing means 97. A variable bias signal, from a battery 111, for example, is adjusted in magnitude to create a desired slip frequency. The bias signal is summed with the signal from summing means 97 to provide the reference oscillator control signal. The control signal is amplified in amplifier 99 and fed to variable oscillator 91. The output frequency of oscillator 91, designated E, is proportional to the control signal from amplifier 99. The E (sine) signal is fed to a 90° phase shifter 92 to form the F (cosine) signal. The E and F signals are then fed to the synchronous demodulators as the reference signals.

Various conditions exist for any electrostatically supported gyroscope that prevent it from performing in the ideal manner described above. These arise from inaccuracies in cavity fabrication and assembly and because of design and component tolerance limitations in the electronics. The actual effective plate centers will not conform to the orthogonal pattern shown in FIG. 2. Bias, gain, and phase errors will always exist in the various electronic channels. These deviations from ideal lead to errors in the components of $\overline{A}$ and $\overline{B}$ as read at the demodulator outputs. A calibration is performed at the time that the gyro and electronics are integrated and these errors are compensated. However, residual errors remain that degrade the accuracy of subsequent operation. To mention one source, residuals come from shifts in the error sources that occur after calibration. It is possible to mechanize the gyro in such a way that the demodulator outputs can, in general, be used to detect and correct these residual errors even while the gyro is in operational use.

To show how such a "self calibration" mode can be mechanized, let $$A_i, B_i \quad i = x, y, z$$

be the demodulator outputs that would be obtained for a given spin axis orientation and demodualtor reference phase with no errors present. Error sources like those mentioned above cause the demodulator outputs to be $$A_i + \delta A_i, B_i + \delta B_i \quad i = x, y, z$$

The errors, $\delta A_i$ and $\delta B_i$, are functions of the magnitudes of the various error sources and of the spin axis orientation and demodulator reference phase. That is, they are $$\delta A_i (k_1, k_2, \ldots, k_n; \overline{A}, \overline{B})$$

$$\delta B_i (k_1, k_2, \ldots, k_n; \overline{A}, \overline{B}) \quad i = x, y, z$$

where the $k$'s are the error source magnitudes. We have already noted that in the ideal, error free, case, the vectors $\overline{A}$ and $\overline{B}$ have unit length and are orthogonal for any spin axis orientation and demodulator reference phase. Thus, $$\overline{A} \cdot \overline{A} - 1 = A_x^2 + A_y^2 + A_z^2 - 1 = 0 \quad (28)$$

$$\overline{B} \cdot \overline{B} - 1 = B_x^2 + B_y^2 + B_z^2 - 2 = 0 \quad (29)$$

$$\overline{A} \cdot \overline{B} = A_x B_x + A_y B_y + A_z B_z = 0 \quad (30)$$

If we form the quantities given by Equations 28, 29, and 30 using the actual demodulator outputs, the results are somewhat different because of the errors contained in these outputs. Let us define $$q_1 = (\overline{A} + \overline{\delta A}) \cdot (\overline{A} + \delta A) - 1 = 2 \overline{A} \cdot \delta A$$
$$= 2(A_x \delta A_x + A_y \delta A_y + A_z \delta A_z)$$

$$q_2 = (\overline{B} + \overline{\delta B}) \cdot (\overline{B} + \delta B) - 1 = 2 \overline{B} \cdot \overline{\delta B}$$
$$= 2(B_x \delta B_x + B_y \delta B_y + B_z \delta B_z)$$

$$q_3 = (\overline{A} + \overline{\delta A}) \cdot (\overline{B} \cdot \overline{\delta B}) = \overline{A} \cdot \overline{\delta B} + \overline{B} \cdot \overline{\delta A} = A_x \delta B_x + A_y \delta B_y + A_z \delta B_z + B_x \delta A_x + B_y \delta A_y + B_z \delta A_z$$

Further, let us define $g_4$ and $g_5$ as the sine and cosine demodulated components of $\eta$, as defined in Equation 11. In the absence of errors $$g_4 g_5 = 0.$$

It is clear that the $q$'s are functions of the error source magnitudes and the spin axis orientation and demodulator reference phase. That is, they are:

$$q_1(k_1, k_2, \ldots, k_n; \overline{A}, \overline{B})$$
$$q_2(k_1, k_2, \ldots, k_y; \overline{A}, \overline{B}) \quad q_3(k_1, k_2, \ldots, k_n; \overline{A}, \overline{B})$$
$$q_4(k_1, k_2, \ldots, k_n; \overline{A}, \overline{B})$$
$$q_5(k_1, k_2, \ldots, k_n; \overline{A}, \overline{B})$$

For the relatively small error source values of practical interest, we can write $$q_v = k_1 \partial / \partial k_1 q(k_1, k_2, \ldots, k_n; \overline{A}, \overline{B})|_{k's=0} + k_2 \partial / \partial k_2 q_v |_{k's=0}$$
$$+ \ldots + k_n \partial / \partial k_n q_v |_{k's=0}, \quad v = 1, 2, \ldots, 5$$

or in matrix form $$\begin{bmatrix} q_1 \\ q_2 \\ q_3 \\ q_4 \\ q_5 \end{bmatrix} = [H] \cdot \begin{bmatrix} k_1 \\ k_2 \\ \vdots \\ k_n \end{bmatrix}$$

where H is a $5 \times n$ matrix whose elements are the partial derivatives of the $q$'ss with respect to the $k$'s. H is a function $\overline{A}$ and $\overline{B}$, but not of the $k$'s. The $q$'s are linear functions of the errors, $k_1, k_2, \ldots, k_n$. The problem is now formulated in such a way that the vast body of knowledge in modern optimum and suboptimum estimation theory can be applied. In terms of that theory $$k = \begin{bmatrix} k_1 \\ k_2 \\ \vdots \\ k_n \end{bmatrix}$$

is the system state vector, and $$q = \begin{bmatrix} q_1 \\ q_2 \\ q_3 \\ q_4 \\ q_5 \end{bmatrix}$$

is the measurement vector and H is the measurement matrix. If $\overline{A}$ and $\overline{B}$ are constant and $n > 5$, it is clear that the system of equations is underdetermined and $k$ can never be solved for completely. The measurability is improved by running the demodulator reference asynchronously with the ball speed ($\delta \omega \neq 0$) so that $\overline{A}$ and $\overline{B}$ rotate with respect to the case. Further, when the case assumes varying attitudes with respect to the ball spin axis, as will happen in the normal useful application of the gyro, measurability becomes very good.

Figure 11:
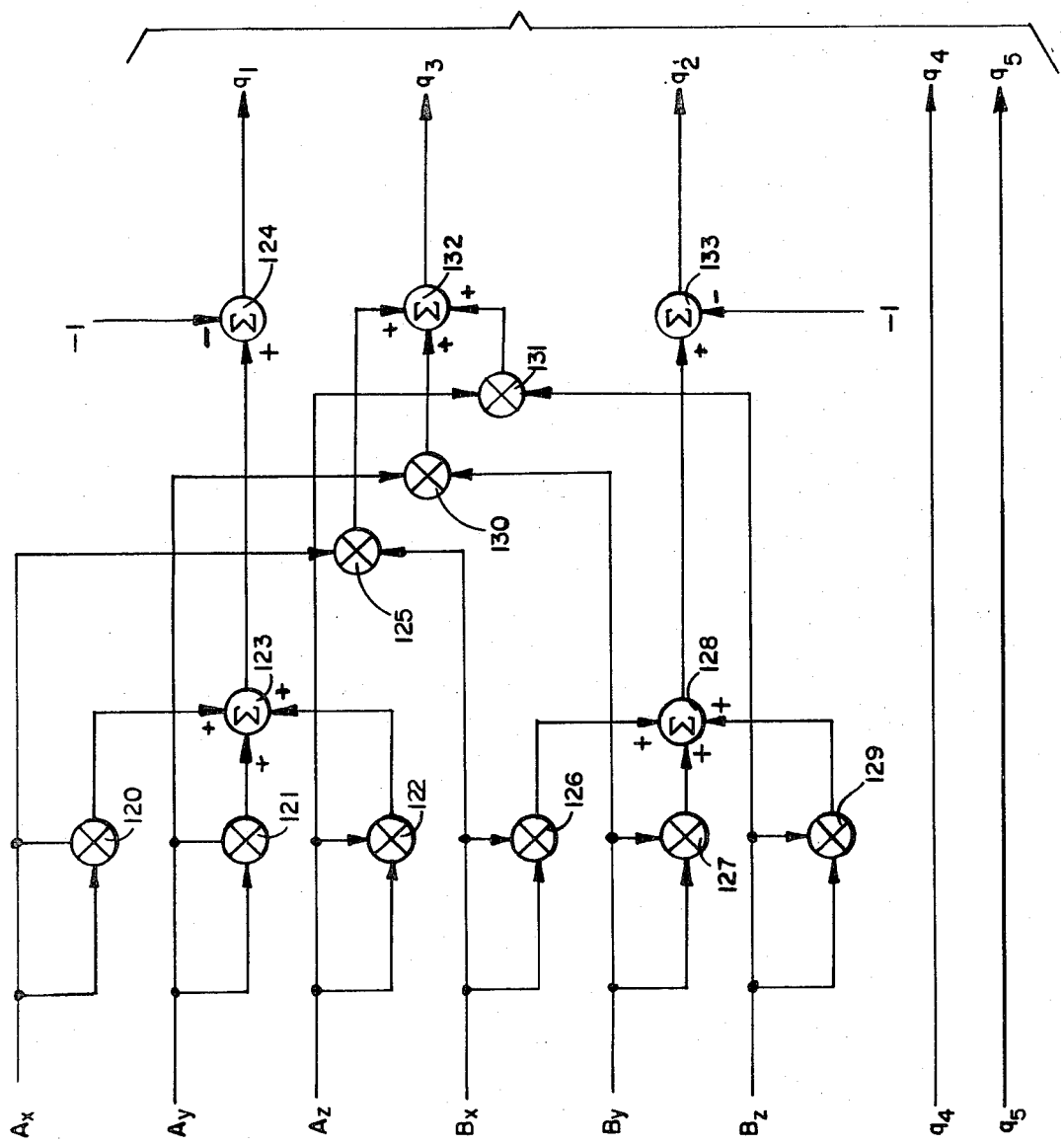
FIG. 11 illustrates in schematic form a means for deriving self-calibration signals from the circuit of FIG. 7.

The implementation for obtaining the values of $q_1$ to $q_3$ is shown in FIG. 11, based upon Equations 28, 29, and 30.

The $A_x$, $A_y$, $A_z$, $B_x$, $B_y$ and $B_z$ signals are squared by multipliers 120, 121, 122, 126 127 and 129, respectively. The $A_{x1}^2$, $A_{y1}^2$ and $A_{x1}^2$ terms are summed together in summer 123. The $A_x$ and $B_x$ terms are multiplied in multiplier 125. The $B_x^2$, $B_y^2$ and $B_z^2$ terms are summed together in summer 128. The $A_y$ and $B_y$ terms are multiplied together in multiplier 130, with the $A_z$ and $B_z$ terms multiplied together in multiplier 131. The outputs from multipliers 125, 130 and 131 are summed together in summing means 132 to form the output $q_3$. The output of summing means 123 is summed with a $-1$ signal in summer 124 to form the output signal $q_1$. The output of summing means 128 is summed with a $-1$ signal in summer 123 to form the output signal $q_2$.

Although the invention has been shown in terms of preferred embodiment, the same is not to be taken by way of limitation. It is intended in the annexed claims to cover all such changes and modifications as fall within the true scope of the invention.

We claim:

1. In combination with a pickoff system for an electrostatic gyroscope of the type wherein there is provided, a case, a set of at least six electrodes in symmetrical array with respect to the case, a ball adpted to spin about a spin axis within the electrode array with the ball constructed and arranged to have its center of mass displaced laterally from the spin axis so that the ball orbits at the spin frequency with circuit means for establishing electrical fields between the electrodes and the ball, which fields are modulated at the spin frequency, the improvement which comprises:
   a. means 11, 14, 30 for detecting the modulated fields between the electrodes and said ball to provide signals proportinal to said detected fields;
   b. means 40, 41, 42, 51, 52, 53 for transforming the detected modulated field signals into signals representing a modulated field resolved into components along three mutually orthogonal axes;
   c. reference carrier signal generating means (90, 91, 92, 111) for generating a first reference signal which is substantially proportional to the spin frequency of said ball and a second reference signal which is displaced in time phase quadrature relative to said first reference signal;
   d. first demodulator means for demodulating each of said mutually orthogonal signal components with respect to said first generated carrier signal;
   e. second demodulator means for demodulating each of said mutually orthogonal signal components with respect to said second generated carrier signal; and
   f. means (70, 71, 72, 73, 74, 75, 80, 81, 82) for combining the demodulated signals from said first and said second demodulator in vector cross-product relationship to form signals proportional to the direction cosines of said spin axis which combined signals define the orientation of said spin axis with respect to said electrode array.

2. The pickoff system according to claim 1 and further comprising:
   carrier frequency control means responsive to the frequency of said demodulated signals for controlling the frequency of the signals from said reference carrier signal generating means proportional to the spin frequency of said ball.

3. The pickoff system according to claim 1 and further comprising:
   low pass filter means for filtering high frequency signal components from said demodulated signals before said signals are forwarded to said means for combining.

4. The pickoff system according to claim 1 and further comprising:
   a. delay means for receiving each of the demodulated signals from said first demodulator means and for delaying each signal by a fixed amount;
   b. difference means for providing a signal which is the difference between the signal from said first demodulator means and the signal from said delayed means;
   c. multiplier means for multiplying each of said difference signals from said difference means by the corresponding demodulated signal from second demodulator means; and
   d. summing means for summing the product signals from said multiplier means to form a control signal which is fed to said reference carrier signal generating means to control the phase relationship between the modulated field signals and the generated reference carrier signals.

5. The pickoff system according to claim 4 and further comprising:
   a. a variable bias signal source; and
   b. a second summing means for summing the signal from the first named summing means with the signal from said variable bias source to provide a control signal which can be varied in phase relationship with said modulated field signals.

6. In combination with a pickoff system for an electrostatic gyroscope of the type wherein there is provided, a case, a set of electrodes in symmetrical array with respect to the case, a ball adapted to spin about a spin axis within the electrode array with the ball constructed and arranged to have its cente of mass displaced laterally from the spin axis so that the ball orbits at the spin frequency with circuit means for establishing electrical fields between the electrodes and the ball, which fields are modulated at the spin frequency, the improvement which comprises:
   a. means for detecting the modulated fields between the electrodes and said ball and for providing signals proportional to said detected fields;
   b. means for transforming the detected modulated field signals into signals having components along three mutually orthogonal axes;
   c. means for rotating by 90° the sigals along said three mutually orthogonal axes; and
   d. means for forming a vector cross product of the rotated and non-rotated orthogonal signals which cross product is the direction cosines of said spin axis with respect to said levitation electrodes.

7. Apparatus for determining the spin vector orientation of an electrostatically supported spinning mass unbalanced ball with respect to pairs of symmetrically positioned levitation electrodes comprising in combination:
   a. means for detecting the modulated fields existing between the electrodes and the spinning ball and providing signals proportional thereto;

b. means for transforming the detected signals into signals having components along three mutually orthogonal axes, said three mutually orthogonal signals representing a first vector;
c. means for rotating the three mutually orthogonal signals 90° to represent a second vector; and
d. means for forming a cross-product signal of said first and said second vectors utilizing said rotated and non-rotated orthogonal signals such that the cross-product signal defines the location of said spin axis with respect to said levitation electrodes.

8. The method of determining the spin vector orientation of an electrostatically supported spinning mass unbalanced ball with respect to pairs of symmetrically positioned levitation electrodes comprising the steps of:
a. detecting the modulated field existing between the electrodes and the spinning ball;
b. transforming the detected modulated signals into signals indicative of the motion of said ball along three mutually orthogonal axes which are fixed with respect to the levitation electrodes;
c. demodulating each of said three orthogonally oriented signals, first with a first carrier reference signal which is related to the spin frequency of the ball to provide a first demodulated signal and second, to demodulate each of said three orthogonally oriented signals with respect to a second carrier signal similarly related to the spin frequency as the first carrier reference signal and in time phase quadrature with such first carrier reference signal to provide second demodulated signals; and
d. combining and transforming each of the first and second demodulated signals by vector cross product to form direction cosine signals of the spin vector orientation with respect to the levitation electrodes.

9. The method of claim 8 and further comprising the step of:
combining each of the first and second demodulated signals in vector dot product form to provide signals containing detectable error components.

10. The method of claim 8 and further comprising the step of:
low pass filtering each of said demodulated signals before the step of combining and transforming.

* * * * *

UNITED STATES PATENT OFFICE
CERTIFICATE OF CORRECTION

PATENT NO. : 3,847,026
DATED : November 12, 1974
INVENTOR(S) : J. C. Boltinghouse, F. M. Pelteson, J. C. Pinson It is certified that error appears in the above-identified patent and that said Letters Patent are hereby corrected as shown below:

In Column 5, line 19, change "euqal" to -- equal --
In Column 7, line 8, change "D" to -- $\bar{D}$ --
In Column 9, line 1, change "$2\omega_s$" to -- $2\omega_s +$ --
In Column 9, lines 46, 47 and 48, Equation (24) change "$\bar{A} = (\bar{I}_x A_x' + \bar{I}_y A_y' + \bar{I}_z A_z') \cos \delta\omega$
$- (\bar{I}_x B_x' + \bar{I}_y B_y' + \bar{I}_z B_z') \sin \delta\omega$
$= \bar{A}' \cos \delta\omega - \bar{B}' \sin \delta\omega$"

to -- $\bar{A} = (\bar{I}_x A_x' + \bar{I}_y A_y' + \bar{I}_z A_z') \cos \delta\omega t$
$- (\bar{I}_x B_x' + \bar{I}_y B_y' + \bar{I}_z B_z') \sin \delta\omega t$
$= \bar{A}' \cos \delta\omega - \bar{B}' \sin \delta\omega t$ --

In Column 11, line 33, change "$\bar{A}_i, B_i \quad i = x, y, z$" to
-- $A_i, B_i \quad i = x, y, z$ --

In Column 11, line 36, change "demodualtor" to -- demodulator --
In Column 11, lines 45, 46 and 47, change "$\delta A_i(k_1, k_2, \ldots, k_n; \bar{A}, \bar{B})$
$\delta B_i(k_1, k_2, \ldots, k_n; \bar{A}, \bar{B}) i = x, y, z$"

UNITED STATES PATENT OFFICE
CERTIFICATE OF CORRECTION

PATENT NO. : 3,847,026
DATED : November 12, 1974
INVENTOR(S) : J. C. Boltinghouse, F. M. Pelteson, J. C. Pinson It is certified that error appears in the above-identified patent and that said Letters Patent are hereby corrected as shown below.

to
$$-- \delta A_i(k_1, k_2, \ldots, k_n; \overline{A}, \overline{B})$$
$$\delta B_i(k_1, k_2, \ldots, k_n; \overline{A}, \overline{B}) \quad i = x, y, z --$$

Column 11, line 56, change "$\overline{B} \cdot \overline{B} - 1 = B_x^2 + B_y^2 + B_z^2 - 2 = 0$"

to -- $\overline{B} \cdot \overline{B} - 1 = B_x^2 + B_y^2 + B_z^2 - 1 = 0$ --

Column 11, line 67, change "$q_1 = (\overline{A} + \overline{\delta A}) \cdot (\overline{A} + \delta A) - 1 + 2\overline{A} \cdot \delta A$"

to -- $q_1 = (\overline{A} + \overline{\delta A}) \cdot (\overline{A} + \overline{\delta A}) - 1 = 2\overline{A} \cdot \overline{\delta A}$ --

Column 13, line 27, change "adpted" to -- adapted --
Column 14, line 42, change "cente" to -- center --
Column 14, line 54, change "sigals" to -- signals --

Signed and Sealed this twenty-eight Day of October 1975

[SEAL]

Attest:

RUTH C. MASON
Attesting Officer

C. MARSHALL DANN
Commissioner of Patents and Trademarks